US009355300B1

(12) United States Patent
Baluja et al.

(10) Patent No.: US 9,355,300 B1
(45) Date of Patent: *May 31, 2016

(54) INFERRING THE GENDER OF A FACE IN AN IMAGE

(71) Applicant: Google Inc., Mountain View, CA (US)

(72) Inventors: Shumeet Baluja, Leesburg, VA (US); Yushi Jing, Mountain View, CA (US)

(73) Assignee: Google Inc., Mountain View, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/056,852

(22) Filed: Oct. 17, 2013

Related U.S. Application Data

(63) Continuation of application No. 13/274,778, filed on Oct. 17, 2011, now Pat. No. 8,588,482, which is a continuation of application No. 11/934,547, filed on Nov. 2, 2007, now Pat. No. 8,041,082.

(51) Int. Cl.
| G06K 9/62 | (2006.01) |
|---|---|
| G06Q 99/00 | (2006.01) |
| G06K 9/00 | (2006.01) |

(52) U.S. Cl.
CPC ................................. *G06K 9/00221* (2013.01)

(58) Field of Classification Search
CPC ... G06K 9/00; G06K 9/0028; G06K 9/00295; G06K 9/46; G06K 9/0032; G06K 9/00302; G06K 9/00322; G06K 9/00221; G06K 9/00228; G06K 9/00268; G06K 9/00288; G06Q 99/00; G06Q 50/01
USPC ......... 382/118, 276, 159, 190, 115, 100, 224; 707/E15.042, E15.017, 803, 713, 714, 707/716, 731, 796, 798, E17.009, E17.999; 705/14.4, 319

See application file for complete search history.

(56) References Cited

U.S. PATENT DOCUMENTS

| 5,724,521 A | 3/1998 | Dedrick |
|---|---|---|
| 5,740,549 A | 4/1998 | Reilly et al. |
| 5,848,397 A | 12/1998 | Marsh et al. |
| 5,913,205 A | 6/1999 | Jain et al. |

(Continued)

FOREIGN PATENT DOCUMENTS

| EP | 1 544 729 | 6/2005 |
|---|---|---|
| JP | 11-265369 | 9/1999 |

(Continued)

OTHER PUBLICATIONS

Accounts, at http://www.cs.rice.edu/~ssiyer/accounts/, as available via the Internet and printed on Jul. 29, 2004.

(Continued)

*Primary Examiner* — Sheela C Chawan
(74) *Attorney, Agent, or Firm* — Fish & Richardson P.C.

(57) ABSTRACT

The subject matter of this specification can be embodied in, among other things, a computer-implemented method that includes receiving a plurality of images having human faces. The method further includes generating a data structure having representations of the faces and associations that link the representations based on similarities in appearance between the faces. The method further includes outputting a first gender value for a first representation of a first face that indicates a gender of the first face based on one or more other gender values of one or more other representations of one or more other faces that are linked to the first representation.

20 Claims, 9 Drawing Sheets

(56) References Cited

U.S. PATENT DOCUMENTS

| | | |
|---|---|---|
| 5,918,014 A | 6/1999 | Robinson |
| 5,948,061 A | 9/1999 | Merriman |
| 5,991,429 A | 11/1999 | Coffin et al. |
| 6,009,422 A | 12/1999 | Ciccarelli |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,256,648 B1 | 7/2001 | Hill et al. |
| 6,269,361 B1 | 7/2001 | Davis et al. |
| 6,356,659 B1 | 3/2002 | Wiskott et al. |
| 6,389,372 B1 | 5/2002 | Glance et al. |
| 6,400,853 B1 | 6/2002 | Shiiyama |
| 6,401,075 B1 | 6/2002 | Mason et al. |
| 6,549,896 B1 | 4/2003 | Candan et al. |
| 6,594,673 B1 | 7/2003 | Smith et al. |
| 6,721,733 B2 | 4/2004 | Lipson et al. |
| 6,792,419 B1 | 9/2004 | Raghavan |
| 6,816,836 B2 | 11/2004 | Basu et al. |
| 6,985,882 B1 | 1/2006 | Del Sesto |
| 7,035,467 B2 | 4/2006 | Nicponski |
| 7,039,599 B2 | 5/2006 | Merriman |
| 7,136,875 B2 | 11/2006 | Anderson et al. |
| 7,324,670 B2 | 1/2008 | Kozakaya et al. |
| 7,492,943 B2 | 2/2009 | Li et al. |
| 7,689,682 B1 | 3/2010 | Eldering et al. |
| 7,701,608 B2 | 4/2010 | Katayama et al. |
| 7,739,276 B2 | 6/2010 | Lee et al. |
| 7,765,218 B2 | 7/2010 | Bates et al. |
| 7,801,907 B2 | 9/2010 | Fischer et al. |
| 7,801,956 B1 | 9/2010 | Cumberbatch et al. |
| 7,809,163 B2 | 10/2010 | Sheu |
| 7,831,595 B2 | 11/2010 | Suresh et al. |
| 7,853,622 B1 | 12/2010 | Baluja et al. |
| 7,860,386 B2 | 12/2010 | Terashima |
| 7,899,218 B2 | 3/2011 | Satoshi |
| 7,904,461 B2 | 3/2011 | Baluja et al. |
| 7,961,986 B1 | 6/2011 | Jing et al. |
| 8,027,541 B2 | 9/2011 | Hua et al. |
| 8,041,082 B1 | 10/2011 | Baluja et al. |
| 8,055,664 B2 | 11/2011 | Baluja et al. |
| 8,140,570 B2 | 3/2012 | Ingrassia et al. |
| 8,588,482 B1 * | 11/2013 | Baluja et al. ............... 382/118 |
| 2002/0023230 A1 | 2/2002 | Bolnick et al. |
| 2002/0116466 A1 | 8/2002 | Trevithick et al. |
| 2002/0120506 A1 | 8/2002 | Hagen |
| 2002/0124053 A1 | 9/2002 | Adams et al. |
| 2003/0013951 A1 | 1/2003 | Stefanescu et al. |
| 2003/0050977 A1 | 3/2003 | Puthenkulam et al. |
| 2004/0042599 A1 | 3/2004 | Zaner et al. |
| 2004/0088325 A1 | 5/2004 | Elder et al. |
| 2004/0098362 A1 | 5/2004 | Gargi |
| 2004/0122803 A1 | 6/2004 | Dom et al. |
| 2004/0143841 A1 | 7/2004 | Wang et al. |
| 2004/0148275 A1 | 7/2004 | Achlioptas |
| 2004/0202349 A1 | 10/2004 | Erol et al. |
| 2004/0215793 A1 | 10/2004 | Ryan et al. |
| 2004/0267604 A1 | 12/2004 | Gross |
| 2005/0043897 A1 | 2/2005 | Meyer |
| 2005/0091202 A1 | 4/2005 | Thomas |
| 2005/0114325 A1 | 5/2005 | Liu et al. |
| 2005/0125308 A1 | 6/2005 | Puentes et al. |
| 2005/0125408 A1 | 6/2005 | Somaroo et al. |
| 2005/0144069 A1 | 6/2005 | Wiseman et al. |
| 2005/0149395 A1 | 7/2005 | Henkin et al. |
| 2005/0154639 A1 | 7/2005 | Zetmeir |
| 2005/0159998 A1 | 7/2005 | Buyukkokten et al. |
| 2005/0171832 A1 | 8/2005 | Hull et al. |
| 2005/0198031 A1 | 9/2005 | Pezaris et al. |
| 2005/0216300 A1 | 9/2005 | Appelman et al. |
| 2005/0278443 A1 | 12/2005 | Winner et al. |
| 2006/0004704 A1 | 1/2006 | Gross |
| 2006/0031121 A1 | 2/2006 | Speicher |
| 2006/0069584 A1 | 3/2006 | Bates et al. |
| 2006/0085259 A1 | 4/2006 | Nicholas et al. |
| 2006/0136098 A1 | 6/2006 | Chitrapura et al. |
| 2006/0159343 A1 | 7/2006 | Grady |
| 2006/0165040 A1 | 7/2006 | Rathod et al. |
| 2006/0184617 A1 | 8/2006 | Nicholas et al. |
| 2006/0190225 A1 | 8/2006 | Grand |
| 2006/0195442 A1 | 8/2006 | Cone et al. |
| 2006/0200432 A1 | 9/2006 | Flinn et al. |
| 2006/0200434 A1 | 9/2006 | Flinn et al. |
| 2006/0200435 A1 | 9/2006 | Flinn et al. |
| 2006/0204142 A1 | 9/2006 | West et al. |
| 2006/0218577 A1 | 9/2006 | Goodman et al. |
| 2006/0224675 A1 | 10/2006 | Fox et al. |
| 2006/0247940 A1 | 11/2006 | Zhu et al. |
| 2006/0248573 A1 | 11/2006 | Pannu et al. |
| 2006/0271460 A1 | 11/2006 | Hanif |
| 2006/0282328 A1 | 12/2006 | Gerace et al. |
| 2006/0294084 A1 | 12/2006 | Patel et al. |
| 2006/0294134 A1 | 12/2006 | Berkhim et al. |
| 2007/0005341 A1 | 1/2007 | Burges et al. |
| 2007/0043688 A1 | 2/2007 | Kountz et al. |
| 2007/0043766 A1 | 2/2007 | Nicholas et al. |
| 2007/0050446 A1 | 3/2007 | Moore |
| 2007/0078846 A1 | 4/2007 | Gulli et al. |
| 2007/0106551 A1 | 5/2007 | McGucken |
| 2007/0121843 A1 | 5/2007 | Atazky et al. |
| 2007/0124721 A1 | 5/2007 | Cowing et al. |
| 2007/0156614 A1 | 7/2007 | Flinn et al. |
| 2007/0192306 A1 | 8/2007 | Papakonstantinou et al. |
| 2007/0203872 A1 | 8/2007 | Flinn et al. |
| 2007/0203940 A1 | 8/2007 | Wang et al. |
| 2007/0218900 A1 | 9/2007 | Abhyanker |
| 2007/0288462 A1 | 12/2007 | Fischer et al. |
| 2008/0004951 A1 | 1/2008 | Huang et al. |
| 2008/0010275 A1 | 1/2008 | Lee et al. |
| 2008/0091834 A1 | 4/2008 | Norton |
| 2008/0103784 A1 | 5/2008 | Wong et al. |
| 2008/0103877 A1 | 5/2008 | Gerken |
| 2008/0104079 A1 | 5/2008 | Craig |
| 2008/0104225 A1 | 5/2008 | Zhang et al. |
| 2008/0120308 A1 | 5/2008 | Martinez et al. |
| 2008/0120411 A1 | 5/2008 | Eberle |
| 2008/0126476 A1 | 5/2008 | Nicholas et al. |
| 2008/0140650 A1 | 6/2008 | Stackpole |
| 2008/0155080 A1 | 6/2008 | Marlow et al. |
| 2008/0159590 A1 | 7/2008 | Yi et al. |
| 2008/0162431 A1 | 7/2008 | Xu et al. |
| 2008/0162510 A1 | 7/2008 | Balo et al. |
| 2008/0189169 A1 | 8/2008 | Turpin et al. |
| 2008/0195657 A1 | 8/2008 | Naaman et al. |
| 2008/0215416 A1 | 9/2008 | Ismalon |
| 2008/0222295 A1 | 9/2008 | Robinson et al. |
| 2008/0243607 A1 | 10/2008 | Rohan et al. |
| 2008/0249966 A1 | 10/2008 | Luege Mateos |
| 2008/0275899 A1 | 11/2008 | Baluja et al. |
| 2009/0018918 A1 | 1/2009 | Moneypenny et al. |
| 2009/0024548 A1 | 1/2009 | Zhu et al. |
| 2009/0063284 A1 | 3/2009 | Turpin et al. |
| 2009/0076800 A1 | 3/2009 | Li et al. |
| 2009/0112701 A1 | 4/2009 | Turpin et al. |
| 2009/0144075 A1 | 6/2009 | Flinn et al. |
| 2009/0192967 A1 | 7/2009 | Luo et al. |
| 2009/0248661 A1 | 10/2009 | Bilenko et al. |
| 2011/0112916 A1 | 5/2011 | Baluja et al. |
| 2011/0219073 A1 | 9/2011 | Lawler et al. |
| 2011/0268369 A1 | 11/2011 | Richards et al. |
| 2012/0054205 A1 | 3/2012 | Baluja et al. |

FOREIGN PATENT DOCUMENTS

| | | |
|---|---|---|
| JP | 2002-132604 | 5/2002 |
| WO | WO 97/21183 | 6/1997 |
| WO | WO 00/68860 | 11/2000 |

(56) References Cited

FOREIGN PATENT DOCUMENTS

| WO | WO 2004/111771 | 12/2004 |
| WO | WO 2006/121575 | 11/2006 |

OTHER PUBLICATIONS

Adamic et al., "A Social Network Caught in the Web," at http://firstmonday.org/issues/issue8_6/adamic/, as available via the Internet and printed on Jul. 28, 2004.
AdForce, Inc., A Complete Guide to AdForce, Version 2.6, 1998.
U.S. Appl. No. 95/001,061, Reexam of Stone.
U.S. Appl. No. 95/001,068, Reexam of Stone.
U.S. Appl. No. 95/001,069, Reexam of Stone.
U.S. Appl. No. 95/001,073, Reexam of Stone.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
AdStar.com website archive from www.Archive.org, Apr. 12, 1997, and Feb. 1, 1997.
Amazon.com, "Selling at Amazon Marketplace," at http://pages.amazon.com/exec/obidos/tg/browse/-/1161234/ref=hp_hp_is_4_2/002-283572 as available via the Internet and printed on Jul. 29, 2004.
Amazon.com, "New Seller FAQ," at http://pages.amazon.com/exec/obidos/tg/browse/-/1161274/002-2835726-5513622 as available via the Internet and printed on Jul. 29, 2004.
Azran, "The Rendezvous Algorithm: Multiclass Semi-Supervised Learning with Markov Random Walks," *ICML*, 2007, 8 pages.
Baluja and Rowley, *Intl J Computer Vision*, 2007, 71(1): at http://portal.acm.org/toc.cfm?id=J325&type=periodical&coll=&dl=ACM&CFID=15151515&CFTOKEN=6184618 (617001 invention disclosure).
Baluja et al., "Video Suggestion and Discovery for YouTube: Taking Random Walks Through the View Graph," *Proc. 17th International World Wide Web Conference (WWW)*, 2008.
Baseview Products, Inc., AdManager Pro Administrator's Manual v. 2.0, Jun. 1998.
Baseview Products, Inc., ClassManagerPro Administration and Receivables Manual v. 1.0.5, Feb. 1, 1997.
Bay et al., "SURF: Speeded up robust features," *Proc. 9th International European Conference on Computer Vision (ECCV)*, pp. 404-417, 2006.
Belongie et al., "Shape matching and object recognition using shape contexts," *IEEE Transactions on Pattern Analysis and Machine Intelligence (TPAMI)*, vol. 24, No. 24, pp. 509-522, 2002.
Boccaletti et al., "Complex Networks: Structure and Dynamics," *Physics Reports*, 2006, 424:175-308.
Brin and Page, "The Anatomy of a Large-Scale Hypertextual Web Search Engine," *Computer Networks*, 1998, pp. 1-26.
Business Wire, "Global Network, Inc. Enters Into agreement in Principle with Major Advertising Agency," Oct. 4, 1999.
Carson et al., "Blobworld: Image Segmentation Using Expectation-Maximization and Its Application to Image Querying," *IEEE transactions on Pattern Analysis and Machine Intelligence (TPAMI)*, 2002, 24(8):1026-1038.
Chakrabarti et al., "Mining the Web's Link Structure," *IEEE Computer Magazine*, 1999, pp. 60-67.
Dalal and Triggs, "Histograms of Oriented Gradients for Human Detection," *Proc IEEE Conf Computer Vision and Pattern Recognition*, Jun. 2005, pp. 886-893 (found in 474001 invention disclosure).
Datar et al., "Locality-sensitive hashing scheme based on p-stable distributions," *Proc 20th Symposium on Computational Geometry (SCG)*, pp. 253-262, 2004.
Datta et al., "Image retrieval: Ideas, influences, and trends of the new age," *ACM Computing Surveys*, vol. 40, No. 2, Articale 5, Publication date: Apr. 2008.
Dedrick, Interactive Electronic Advertising, IEEE, 1994, pp. 55-66.
Dedrick, A Consumption Model for Targeted Electronic Advertising, Intel Architecture Labs, IEEE, 1995, pp. 41-49.
Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf (1084 invention disclosure).
Doctorow, "Running Notes from Revenge of the User: Lessons from Creator/User Battles," at http://craphound.com/danahetcon04.txt, as available via the Internet and printed Jun. 28, 2004.
Ebay.com, "What is eBay?" at http://pages.ebay.com/help/welcome/questions/about-ebay.html as available via the Internet and printed on Jul. 29, 2004.
Ebay.com, "How to Bid," at http://pages.ebay.com/help/welcome/bid.html as available via the Internet and printed on Jul. 29, 2004.
Ebay.com, "How to Sell," at http://pages.ebay.com/help/welcome/sell.html as available via the Internet and printed on Jul. 29, 2004.
Facebook Press Release "Leading Websites Offer Facebook Beacon for Social Distribution, Users Gain Ability to Share their Action from 44 Participating Sites with their Friends on Facebook" [online] [retrieved on Jan. 24, 2008] [retrieved from the internet: http://www.facebook.com/press/releases.php?p9166] 1 page. (Same ref as "Press Releases Facebook".
Jessica Zhang , 'Facebook unveils school-specific advertisements' [online]. The Stanford Daily, 2005, [retrieved on Aug. 16, 2010]. Retrieved from the Internet: http://www.stanforddaily.com/2005/01/06/facebook-unveils-school-specific-advertisements/, (Jan. 6, 2005) 1 page.
Fergus et al., "A visual category filter for Google images," *Proc. 8th European Conference on Computer Vision (ECCV)* , 2004, pp. 242-256.
Fergus et al., "Object class recognition by unsupervised scale-invariant learning," *Proc. Conference on Computer Vision and Pattern Recognition (CVPR)*, 2003, 2:264-271.
Frey and Dueck, "Clustering by Passing Messages Between Data Points," *Science*, 2007, 315:972-976.
Friedman et al., "Bayesian network classifiers," *Machine Learning*, 1997, 29:131-163.
Frome et al., "Learning globally-consistent local distance functions for shape-based image retrieval and classification," *Proc. 11th IEEE International Conference on Computer Vision (ICCV)*, pp. 1-8, 2007.
Gibson et al., "Inferring Web Communities from Link Topology," *Proc 9th ACM Conference on Hypertex and Hypermedia*, 1998, 10 pages (found in 473001 invention disclosure).
Gionis et al., "Similarity Search in High Dimensions via Hashing," Proc 25th *Very Large Database Conf*, 1999 at people.csail.mit.edu/indyk/vldb99.ps (1084 invention disclosure).
Glance et al., "Knowledge Pump: Supporting the Flow and Use of Knowledge," *Information Technology for Knowledge Management*, 1997, Borghoff and Pareschi (eds.), Springer Verlag, 22 pages.
Grauman and Darrell, "The Pyramid Match Kernel: Discriminative Classification with Sets of Image Features," *ICCV 2005* at http://people.csail.mit.edu/kgrauman/jobapp/kgrauman_sample_papers.pdf (found in 474001 invention disclosure).
Harris and Stephens, "A combined corner and edge detector," *Proc. 4th Alvey Vision Conference*, pp. 147-151, 1988.
Haveliwala, "Topic-Sensitive PageRank," *IEEE Transactions on Knowledge and Data Engineering*, 2003, 10 pages.
He et al., "Imagerank: spectral techniques for structural analysis of image database," *Proc. International Conference on Multimedia and Expo*, 2002, 1:25-28.
Herlocker et al., "Evaluating Collaborative Filtering Recommender Systems," *ACM Transactions on Information Systems*, 2004, 22(1):5-53.
Hsu et al., "Video search reranking through random walk over document-level context graph," *Proc. 15th International Conference on Multimedia*, 2007 pp. 971-980.
Indyk and Motwani, "Approximate Nearest Neighbors: Towards Removing the Curse of Dimensionality," *Proc. 30th ACM Symp. On Computational Theory*, 1998, pp. 604-613.

(56) References Cited

OTHER PUBLICATIONS

Indyk, "Stable Distributions, Pseudorandom Generators, Embeddings, and Data Stream Computation," *Proc. 41st IEEE Symposium on Foundations of Computer Science (FOCS)*, pp. 189-197, 2000.
Information Access Technologies, Inc., Aaddzz brochure, "The best Way to Buy and Sell Web Advertising Space," 1997.
Information Access Technologies, Inc., Aaddzz.com website archive from www.Archive.org, archived on Jan. 30, 1998.
Jeh and Widom, "SimRank: A Measure of Structural-Context Similarity," *Proc 8th ACM SIGKDD international conference on knowledge discovery and data mining*, Jul. 2002, pp. 538-543 (found in 473001 invention disclosure).
Jing et al., "Canonical image selection from the web," *Proc. 6th International Conference on Image and Video Retrieval (CIVR)*, pp. 280-287, 2007.
Jing and Baluja, "VisualRank: Applying PageRank to Large-Scale Image Search," *IEEE Transaction on Pattern Analysis and Machine Intelligence*, 2008, 30(11):1877-1890.
Joachims, "Text Categorization with Support Vector Machines: Learning with Many Relevant Features," *Proc 10th European Conf on Machine Learning*, 1998, pp. 137-142 (533 invention disclosure).
Joshi et al., "The story picturing engine—a system for automatic text illustration," *ACM Transactions on Multimedia, Computing, Communications and Applications*, 2006, 2(1):68-89.
Kautz et al., "ReferralWeb: Combining Social Networks and Collaborative Filtering," *Communications of the ACM*, 1997, 40(3):1-4.
Ke et al., "Efficient near-duplicate detection and sub-image retrieval," *Proc. ACM International Conference on Multimedia (ACM MM)*, pp. 869-876, 2004.
Ke and Sukthankar, "PCA-SIFT: A More Distinctive Representation for Local Image Descriptors," *Proc. Conference on Computer Vision and Pattern Recognition (DVPR)*, 2004, 2:506-516.
Kleinberg et al., "The Web as a graph: measurements, models, and methods," *Proc International Conference on Combinatronics*, 1999, 18 pages.
Kleinberg, "Authoritative Sources in a Hyperlinked Environment," *Journal of the ACM*, 1999, 46(5):604-632.
Kondor and Lafferty, "Diffusion kernels on graphs and other discrete structures," *Proc. 19th International Conference on Machine Learning (ICML)*, pp. 315-322, 2002.
Konstan et al., "GroupLens: Applying Collaborative Filtering to Usenet News," *Communications of the ACM*, Mar. 1997, 40(3):77-87.
Lazebnik et al., "A sparse texture representation using affine-invariant regions," *Proc. Conference on Computer Vision and Pattern Recognition (CVPR)*, vol. 2, pp. 319-324, 2003.
Leigh et al., "Transformation, Ranking, and Clustering for Face Recognition Algorithm Comparison," at http://www.itl.nist.gov/div898/itperf/renorm.pdf (617001 invention disclosure).
Liew et al., "Social Networks," U.S. Appl. No. 60/552,718, filed Mar. 15, 2004, 9 pages.
Liu et al., "A Comparative Study on Feature selection and Classification methods Using Gene Expression Profiles and Proteomic Patterns," *Genome Informatics* 13:, pp. 51-60, 2002.
Liu et al., "An Investigation of Practical Approximate Nearest Neighbor Algorithms," *Proc Neural Information Processing Systems*, 2004 at http://www.cs.cmu.edu/~tingliu/research.htm (1084 invention disclosure).
Lowe, "Distinctive Image Features from Scale-Invariant Keypoints," *International Journal of Computer Vision (IJCV)*, 2004, 60(2):91-110.
Lowe, "Local Feature View Clustering for 3D Object Recognition," *CVPR 2001*, at http:/www.cs.ubc.ca/~lowe/papers/cvpr01.pdf (found in 473001 and 474001 invention disclosures).
Ma and Manjunath, "NeTra: AToolbox for Navigating Large Image Databases," *Multimedia System*, 1999, 3(7):184-198.
Microsoft Corporation, "Is Friendster the 'Next Big Thing'?" at http://mobilemomentum.msn.com/article.aspx?aid=4, as available via the Internet and printed on Jul. 29, 2004.
Mikolajczyk and Schmid, "A performance evaluation of local descriptors," *IEEE Transactions on Pattern Analysis and Machine Intelligence (TPAMI)*, 2005, 27(10):1615-1630.
Monay and Gatica-Perez, "On Image Auto-Annotation with Latent Space Models," *MM'03*, Nov. 2-8, 2003.
Multiply, "About Multiply," at http://multiply.com/info/about, as available via the Internet and printed on May 3, 2004.
Multiply, "Help," at http://multiply.com/info/help, as available via the Internet and printed on May 3, 2004.
Multiply, "Multiply Privacy Policy," at http://multiply.com/info/privacy, as available via the Internet and printed on May 3, 2004.
Multiply, "Multiply Terms of Service," at http://multiply.com/info/tos, as available via the Internet and printed on May 3, 2004.
Nistér and Stewénius, "Scalable recognition with a vocabulary tree," *Proc. Conference on Computer vision and Pattern Recognition (CVPR)*, vol. 2, pp. 2161-2168, 2006.
Nowak and Jurie, "Learning visual similarity measures for comparing never seen objects," *Proc. Conference on Computer Vision and Pattern Recognition (CVPR)*, 2007.
Park et al., "Majority based ranking approach in web image retrieval," *Lecture Notes in Computer Science*, vol. 27-28, pp. 499-504, 2003.
Pentland et al., "Photobook: Content-based manipulation of image databases," *International Journal of Computer Vision (IJCV)*, 1996, 18(3):233-254.
Philbin et al., "Object retrieval with large vocabularies and fast spatial matching," *Proc. Conference on Computer Vision and Pattern Recognition (CVPR)*, 2007.
Pilászy, "Text Categorization and Support Vector Machines," *Computer Science*, 1998, vol. 1398, 10 pages.
Press Releases Facebook "Leading Websites Offer Facebook Beacon for Social Distribution," [online] [retrieved from the internet: http://www.facebook.com/press/releases.php?p9166] [retrieved on Jan. 24, 2008], 1 page (same ref as "Facebook Press Release") Cite "Facebook Press Release".
Roach et al., "Video Genre Classification Using Dynamics," 2001, *Proc Acoustics, Speech, and Signal Processing on IEEE Intl Conference*, pp. 1557-1560 (955001 invention disclosure).
Rothganger et al., "3D Object Modeling and Recognition Using Affine-Invariant Patches and Multi-View Spatial Constraints," *CVPR 2003*, at http://vasc.ri.cmu.edu/~hebert/04AP/fred_cvpr03.pdf (found in 473001 and 474001 invention disclosures).
Rowley et al., "Neural Network-Based Face Detection," *IEEE Transactions on Pattern Analysis and Machine Intelligence*, 1998, 20(1): (617001 invention disclosure).
Schindler et al., "City-Scale Location Recognition," *Proc. Conference on Computer Vision and Pattern Recognition (CVPR)*, 2007, 7 pages.
Sebastiani, "Machine Learning in Automated Text Categorization," *ACM Computing Surveys*, 2002, 34(1):1-47.
Simon et al., "Scene summarization for online image collections," *Proc. 12th International Conference on Computer Vision (ICCV)*, 2007.
Smeulders et al., "Content based image retrieval at the end of the early years," *IEEE Transactions on Pattern Analysis and Machine Intelligence (TPAMI)*, 2000, 22(12):1349-1380.
Sullivan, Danny, "Is It Really Personalized Search?" http://searchenginewatch.com printed on May 13, 2004.
Szummer and Jaakkola, "Partially labeled classification with Markov random walks," *NIPS 2001* (473001 invention disclosure).
Tribe.net, "Listings Directory," at http://www.tribe.net/tribe/servlet/template/pub.Listings.vm, as available via the Internet and printed on Jun. 28, 2004.
Uchihashi and Kanade, "Content-free image retrieval by combinations of keywords and user feedbacks," *Proc. 5th International Conference on Image and Video Retrieval (CIVR)*, pp. 650-659, 2005.
Viola and Jones, "Robust Real Time Face Detection," *Int J Computer Vision*, 2004 at http://scholar.google.com/scholar?h1=en&lr=&cluster=10098362814192689387 (617001 invention disclosure).
Wang et al., "AnnoSearch: Image Auto-Annotation by Search," *CVPR 2006* (in 473001 invention disclosure).

(56) References Cited

OTHER PUBLICATIONS

Weinberger et al., "Distance metric learning for large margin nearest neighbor classification," *Proc. 18th Conference on Advances in Neural Information Processing Systems (NIPS)*, vol. 18, pp. 1437-1480, 2006.

Winder and Brown, "Learning local image descriptors," *Prof. Conference on Computer Vision and Pattern Recognition (CVPR)*, 2007.

Xing et al., "Distance metric learning, with applications to clustering with side-information," *Proc. 15th Conference on Advances in Neural Information Processing Systems (NIPS)*, 2002, 15:450-459.

Yang et al., "Mining Social Networks for Targeted Advertising," *Proceedings of the 39th Hawaii International Conference on System Sciences*, 2006.

Yang and Pedersen, "A Comparative Study on Feature Selection in Text Categorization Source," *Proc 14th Intl Conf Machine Learning*, 1997, pp. 412-420.

Zeff et al., *Advertising on the Internet*, 2nd ed., John Wiley & Sons, 1999.

Zhou and Schölkopf, "Learning from Labeled and Unlabeled Data Using Random Walks," *Lecture notes in computer science*, 2004, Springer, 8 pages.

Zhu et al., "Semi-Supervised Learning Using Gaussian Fields and Harmonic Functions," *Proc. 20th Intl Conf on Machine Learning*, 2003, 8 pages.

Zhu, "Semi-Supervised Learning with Graphs," 2005, Doctoral Thesis, Carnegie Mellon University, 174 pages.

International Search Report/Written Opinion in PCT/US2008/062263 mailed Jan. 1, 2008, 13 pages.

International Preliminary Report on Patentability in PCT/US2008/062263 mailed Nov. 12, 2009, 7 pages.

International Search Report/Written Opinion in PCT/US2008/62285 mailed Dec. 5, 2008, 12 pages.

International Preliminary Report on Patentability in PCT/US2008/62285 mailed Nov. 12, 2009, 8 pages.

\* cited by examiner

700

| Face ID | Comparison Images | Male Gender Value | Female Gender Value |
|---|---|---|---|
| Face A | Table A | 1.00 | 0.00 |
| Face B | Table B | 0.75 | 0.24 |
| ... | ... | ... | ... |

| Face ID | Similarity Score |
|---|---|
| Face B | 0.7 |
| Face C | 0.5 |
| Face D | 0.1 |
| ... | ... |

INFERRING THE GENDER OF A FACE IN AN IMAGE

CROSS-REFERENCE TO RELATED APPLICATION

This application is a continuation application of and claims priority to U.S. application Ser. No. 13/274,778, filed on Oct. 17, 2011, which claims priority to U.S. application Ser. No. 11/934,547, filed on Nov. 2, 2007, the entire contents of which are hereby incorporated by reference.

TECHNICAL FIELD

This instant specification relates to inferring the gender of a face in an image.

BACKGROUND

In many application domains, such as photo collection, social networking, surveillance, adult-content detection, etc, it is desirable to use an automated method to determine the gender of a person in an image. Some systems use computer vision algorithms in an attempt to determine gender by directly analyzing a face within an image to determine if the face is associated with typically male or female characteristics.

SUMMARY

In general, this document describes inferring the gender of a person or animal from a set of images. The faces are represented in a data structure and includes links between faces having similarities.

In a first aspect, a computer-implemented method includes receiving a plurality of images having human faces. The method further includes generating a data structure having representations of the faces and associations that link the representations based on similarities in appearance between the faces. The method further includes outputting a first gender value for a first representation of a first face that indicates a gender of the first face based on one or more other gender values of one or more other representations of one or more other faces that are linked to the first representation.

In a second aspect, a computer-implemented method includes receiving a plurality of images having animal faces. The method further includes generating a graph having nodes representing the faces and edges that link the nodes based on similarities in appearance between the faces represented by the nodes. The method further includes outputting a first gender value for a first node that indicates a gender of a first face associated with the first node based on one or more second gender values of one or more neighboring nodes in the graph.

In a third aspect, a computer-implemented method includes receiving a plurality of images having animal faces. The method further includes generating a data structure that associates a first face with one or more second faces based on similarities in appearance between the first face and the one or more second faces. The method further includes outputting a first gender value for the first face based on one or more gender values previously associated with the one or more second faces.

In a fourth aspect, a system includes a face detector for identifying faces within images. The system further includes means for generating a data structure configured to associate a first face with one or more second faces based on similarities in appearance between the first face and the one or more second faces. The system further includes an interface to output a first gender value for the first face based on one or more gender values previously associated with the one or more second faces.

The systems and techniques described here may provide one or more of the following advantages. First, an automated method is provided for identifying the gender of a person (or persons) in a collection of images. Second, a gender detection method is provided that does not require large data sets for training a statistical gender classifier. Third, a method for gender detection is provided that does not rely on computer vision techniques to directly identify a gender of a face based on an image of the face. Fourth, genders associated with androgynous faces within images can be more accurately determined.

The details of one or more embodiments are set forth in the accompanying drawings and the description below. Other features and advantages will be apparent from the description and drawings, and from the claims.

DESCRIPTION OF DRAWINGS

FIG. 7A shows an example of a table that stores gender values for faces.

FIG. 7B shows an example of a table that stores similarity scores between a first face and other faces.

Like reference symbols in the various drawings indicate like elements.

DETAILED DESCRIPTION

This document describes systems and techniques for inferring the gender of a face in an image. A network, such as the Internet or a wide area network, can include servers hosting images of people and/or other animals. In general, an image of a female face may have similarities with images of other female faces and an image of a male face may have similarities with images of other male faces. In certain implementations, a gender determination system analyzes the similarities between the faces, including faces having a known gender and faces having an unknown gender. The gender determination system can use the similarities and the known genders to infer a gender of one or more faces having an unknown gender.

In certain implementations, a face having an unknown gender may have little or no direct similarities with the faces having a known gender. The gender determination system may determine that the face having the unknown gender has similarities with one or more other unknown gender faces. The gender determination system may also determine that one or more of the other unknown gender faces have similarities with one or more faces having known genders. The gender determination system can use the chain of intermediate faces to infer the gender of the face having an unknown gender by indirectly relating the unknown gender face to a face having a known gender.

Figure 1:
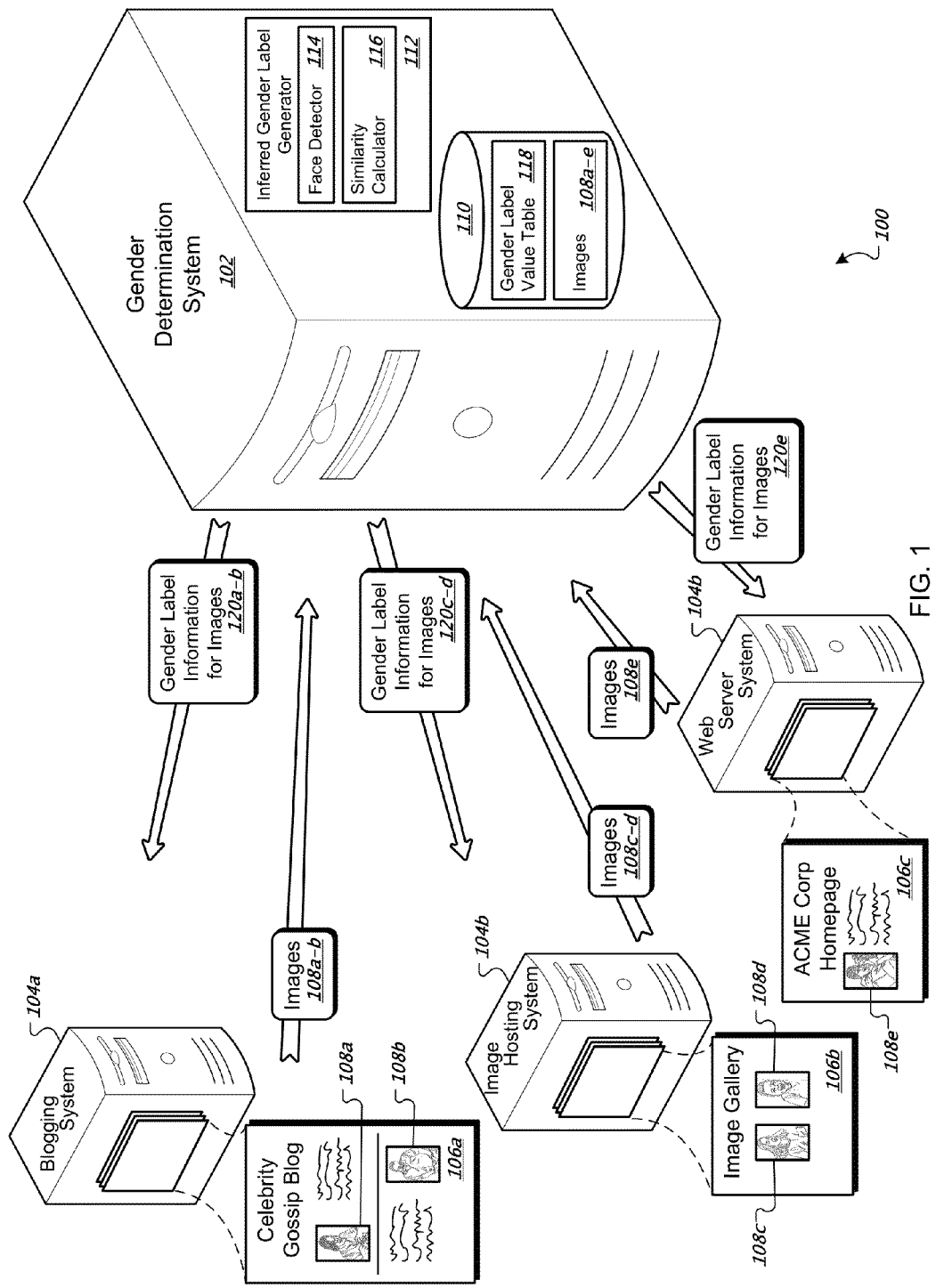
FIG. 1 is a schematic diagram showing an example of a system for inferring the gender of a face in an image.

FIG. 1 is a schematic diagram showing an example of a system 100 for inferring the gender of a face in an image. The system 100 includes a gender determination system 102 and multiple publisher systems 104a-c, such as a web logging (blogging) server, an image hosting server, and a company web server, respectively. The gender determination system 102 communicates with the publisher systems 104a-c using one or more networks, such as the Internet, and one or more network protocols, such as Hypertext Transport Protocol (HTTP).

In the case of HTTP communication, the publisher systems 104a-c can include multiple web pages 106a-c, respectively. For example, the web page 106a published by the blogging system is a celebrity gossip blog, the web page 106b published by the image hosting system is an image gallery, and the web page 106c published by the web server system is a homepage for the ACME Corporation. The web pages 106a-c each include one or more images 108a-e. The images 108a-e include faces of people and/or other animals. The gender determination system 102 retrieves the images 108a-e from the publisher systems 104a-c and stores the images 108a-e in a data storage 110.

The gender determination system 102 includes an inferred gender label generator 112 that performs processing to infer the gender of the faces in the images. The inferred gender label generator 112 includes a face detector 114 and a similarity calculator 116. The face detector 114 uses face detection algorithms known to those skilled in the art to detect faces in the images 108a-e. In certain implementations, the face detector 114 stores the portions of the images 108a-e that include faces in the data storage 110. Alternatively, the face detector 114 may store information that describes the location of the face portions within the images 108a-e. The face detector 114 passes the face information to the similarity calculator 116 or otherwise notifies the similarity calculator 116 of the face information.

The similarity calculator 116 calculates similarity scores between pairs of faces. The similarity calculator 116 uses facial analysis algorithms known to those skilled in the art. For example, one such facial analysis algorithm is discussed in a paper entitled "Transformation, Ranking, and Clustering for Face Recognition Algorithm Comparison," by Stefan Leigh, Jonathan Phillips, Patrick Grother, Alan Heckert, Andrew Ruhkin, Elaine Newton, Mariama Moody, Kimball Kniskern, Susan Heath, published in association with the Third Workshop on Automatic Identification Advanced Technologies, Tarrytown, March 2002.

The inferred gender label generator 112 includes or has access to predetermined gender information for one or more of the faces. For example, a user may make an input indicating that a face in the image 108a has a gender of female and a face in the image 108b has a gender of male. Alternatively, the inferred gender label generator 112 may generate predetermined gender information based on an algorithm, such as associating a distinguishing feature within a face as male or female. The inferred gender label generator 112 uses the predetermined gender information and the similarity scores between the faces to link each of the faces directly or indirectly to the faces having predetermined or known genders. The inferred gender label generator 112 uses the links to infer a gender for the faces. The inferred gender label generator 112 stores the similarity scores and inferred genders in the data storage 110 as a gender label value table 118.

The gender determination system 102 can output genders of the faces as gender label information 120a-e for the images 108a-e, respectively, to the publisher systems 104a-c. In another implementation, the gender determination system 102 can include, or provide gender information to, an image search engine. For example, a user may make an input indicating a search for images of people or animals having a particular gender. The gender determination system 102, or another image search system, uses the gender label information 120a-e to provide images having the requested gender.

Figure 2:
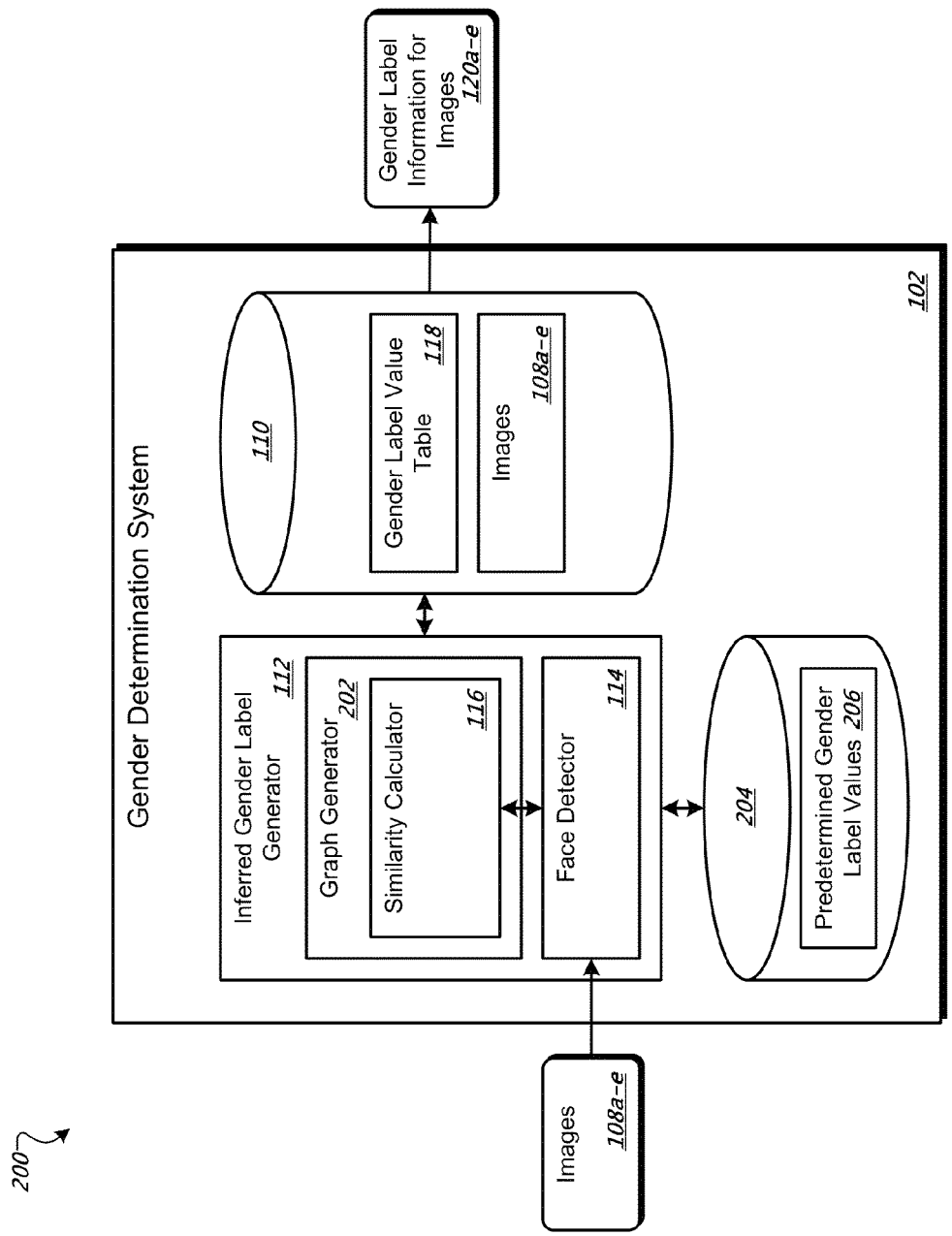
FIG. 2 is a block diagram showing another example of a system for inferring the gender of a face in an image.

FIG. 2 is a block diagram showing an example of a system 200 for inferring the gender of a face in an image. The system 200 includes the gender determination system 102 as previously described. The inferred gender label generator 112 receives the images 108a-e and may store the images 108a-e in the data storage 110. The inferred gender label generator 112 uses the face detector 114 to locate faces within the images 108a-e. Subsequently or concurrently, the inferred gender label generator 112 uses the similarity calculator 116 to calculate similarity scores between faces.

In the system 200, the similarity calculator 116 is included in a graph generator 202. The graph generator 202 generates a graph of the faces in the images 108a-e. Each face represents a node in the graph. The graph generator 202 represents the similarity scores between faces as edges that link the nodes. Each edge is associated with its similarity score. The edges linking the nodes may be undirected, bi-directional, or uni-directional. For the purposes of clarity, the edges in the following examples are undirected unless otherwise specified.

The inferred gender label generator 112 associates each face with one or more gender labels and each gender label may have a gender label value. In some implementations, the gender label values are numeric values, such as decimal numbers. For example, the face in the image 108a may have gender labels of "Male" and "Female" with associated gender label values of "0.00" and "1.00," respectively. The inferred gender label generator 112 stores the gender label values in the gender label value table 118.

In some implementations, the gender determination system 102 includes a data storage 204 that stores one or more predetermined gender label values 206. The gender determination system 102 may receive the predetermined gender label values, for example, from a user input. The graph generator 202 associates the predetermined gender label values 206 with corresponding nodes in the graph. For example, a user may input the gender label values of "0.00" Male and "1.00" Female for the face in the image 108a. The graph generator 202 associates the gender label values with the node in the graph that represents the face from the image 108a. The inferred gender label generator 112 subsequently uses the predetermined gender label values 206 as a starting point, or seed, for the algorithm to infer other gender label values of faces included in other images.

Figure 3A:
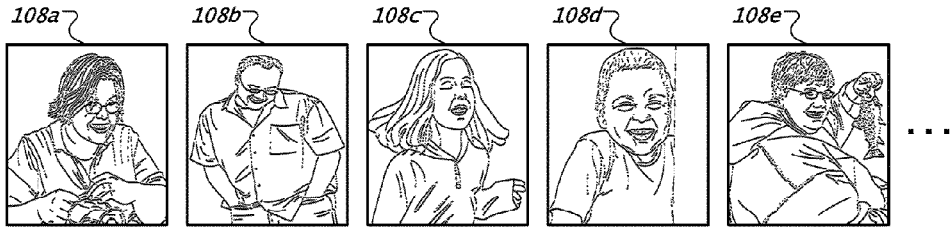
FIG. 3A shows examples of images used for inferring a gender of a face in an image.

FIG. 3A shows examples of the images 108a-e used for inferring a gender of a face in an image. The gender determination system 102 may use images such as the images 108a-e or other images. The gender determination system 102 may also use fewer or more images than are shown here. The images 108a-e all include a person having a face. In some implementations, an image may include multiple people or animals. In this example, the image 108a is an adult female, the image 108b is an adult male, the image 108c is a female child, the image 108d is a male child, and the image 108e is a picture of a somewhat androgynous adult.

Figure 3B:
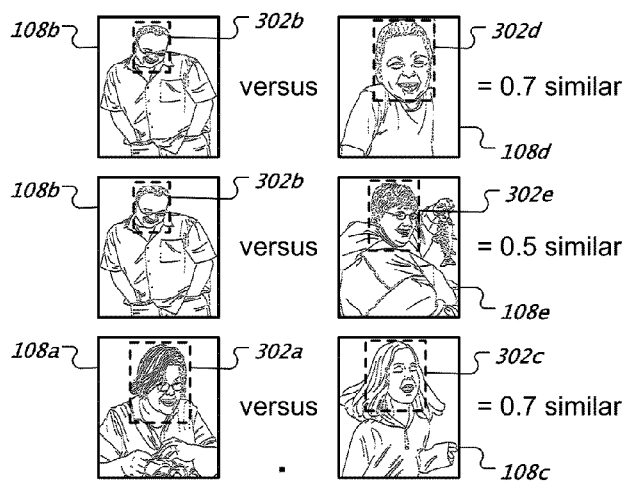
FIG. 3B shows examples of comparisons and similarities between faces in images.

FIG. 3B shows examples of comparisons and similarities between multiple faces 302a-e in the images 108a-e. The face detector 114 identifies regions within the images 108a-e that represent the faces 302a-e. The similarity calculator 116 compares features between faces to determine similarity scores between faces. In some implementations, the similarity calculator 116 compares pairs of faces and determines a similarity score for each pair of faces. In some implementations, the similarity score is a decimal number in the range from zero to one, where zero indicates no similarity and one indicates that the faces are identical or indistinguishable.

For example, the similarity calculator 116 may determine similarity scores of "0.7" between the faces 302b and 302d, "0.5" between the faces 302b and 302e, and "0.7" between the faces 302a and 302c. The similarity scores of "0.7" indicate that the faces 302b and 302d are significantly similar and the faces 302a and 302c are significantly similar. The similarity score of "0.5" indicates that the faces 302b and 302e are only somewhat similar.

The similarity calculator 116 may perform the comparison and calculate a similarity score for each pair of images. The graph generator 202 uses the similarity scores to generate the graph representing similarities between the faces 302a-e.

Figure 3C:
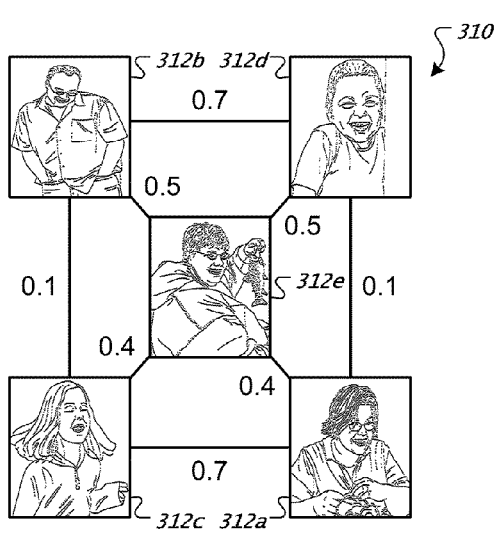
FIG. 3C shows an example of a weighted undirected graph of the similarities between the faces in the images.

FIG. 3C shows an example of a weighted undirected graph 310 of the similarities between the faces 302a-e in the images 108a-e. The graph generator 202 represents the faces 302a-e with multiple nodes 312a-e, respectively. The graph generator 202 links pairs of nodes with edges that represent a similarity score between the linked pair of nodes. For example, the graph generator 202 links the nodes 312b and 312d with an edge having an associated similarity score of "0.7." In some implementations, the graph generator 202 generates an edge between each pair of nodes in the weighted undirected graph 310. In some implementations, the graph generator 202 links a portion of the pairs of nodes with edges. For example, the graph generator 202 can link pairs of nodes having a threshold similarity score. In another example, the graph generator 202 can link a threshold number of nodes to a particular node, such as the five nodes having the highest similarity scores with the particular node. For the purposes of clarity in explanation, the weighted undirected graph 310 only includes edges between neighboring nodes.

Figure 3D:
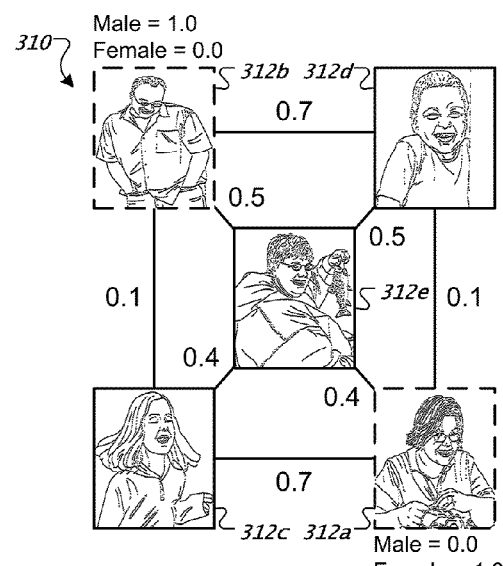
FIG. 3D shows an example of manually identified gender values for a portion of the weighted undirected graph.

FIG. 3D shows an example of manually identified gender values for a portion of the weighted undirected graph 310. As previously described, the gender determination system 102 includes the predetermined gender label values 206. The graph generator 202 associates the predetermined gender label values 206 with corresponding nodes. For example, the graph generator 202 associates gender label values of "1.0" Male and "0.0" Female with the node 312b and "0.0" Male and "1.0" Female with the node 312a.

In this example of a weighted undirected graph, each node eventually has a Male gender label and a Female gender label (e.g., either predetermined or inferred). The nodes 312a-b have predetermined Male and Female gender labels and label values. As described below, the inferred gender label generator 112 uses the weighted undirected graph 310 to infer Male and Female gender label values for the nodes 312c-e. Although this example describes two gender labels, in other implementations, a node may have zero, three, or more gender labels as well.

In some implementations, the inferred gender label generator 112 also infers gender label values for nodes having predetermined gender label values. Inferred gender label values for nodes having predetermined gender label values can be used to check the accuracy of the inferred gender label generator 112 and/or to check for possible errors in the predetermined gender label values 206.

Figure 4:
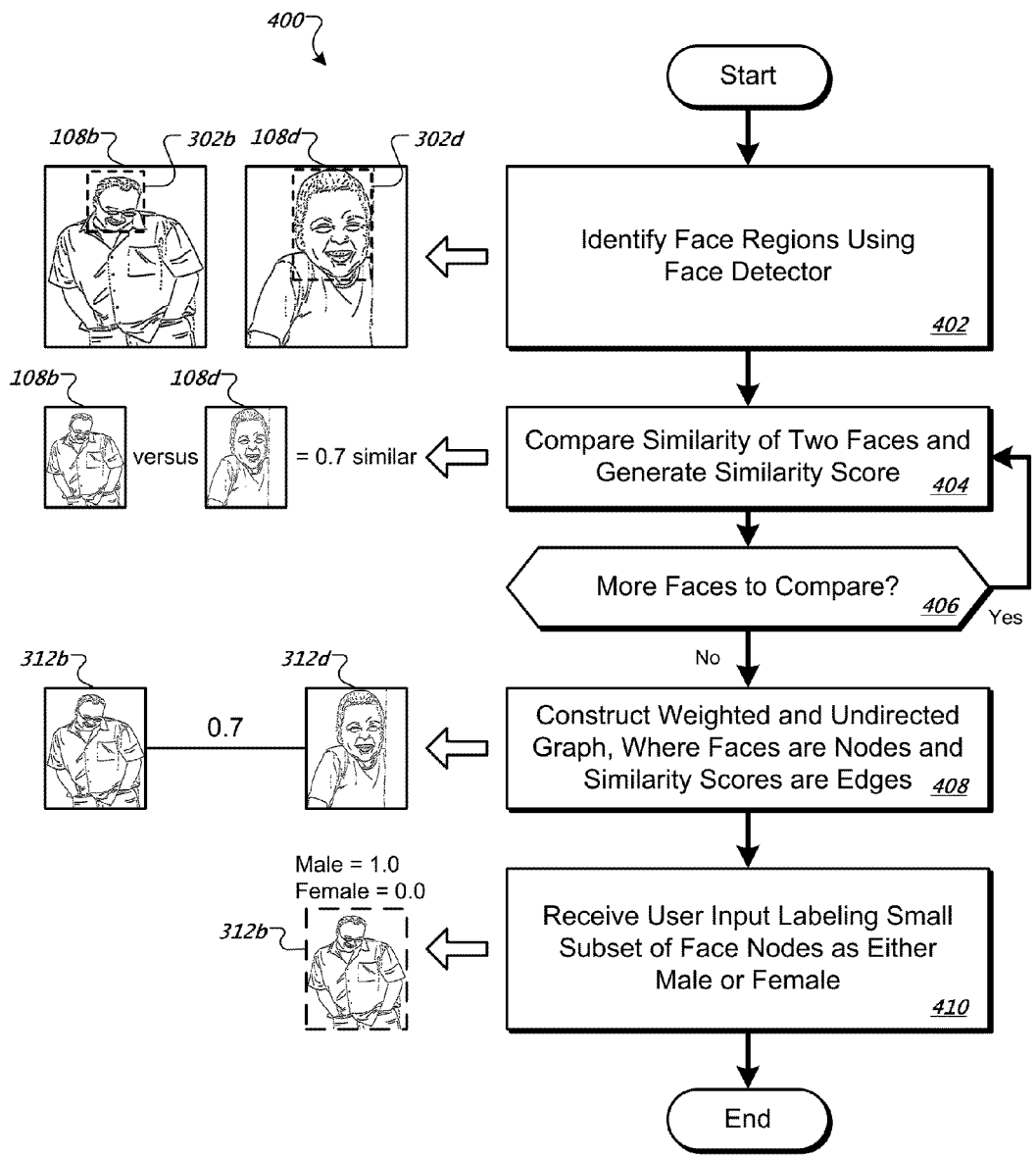
FIG. 4 is a flow chart showing an example of a method for constructing a weighted undirected graph of similarities between faces in images.

FIG. 4 is a flow chart showing an example of a method 400 for constructing a weighted undirected graph of similarities between faces in images. In some implementations, the face detector 114, the similarity calculator 116, and the graph generator 202 can include instructions that are executed by a processor of the gender determination system 102.

The method 400 can start with step 402, which identifies face regions using a face detector. For example, the inferred gender label generator 112 can use the face detector 114 to locate the regions of the images 108b and 108d that include the faces 302b and 302d, respectively.

In step 404, the method 400 compares two faces and generates a similarity score representing the similarity between the two faces. For example, the similarity calculator 116 compares the faces 302b and 302d and calculates the similarity score of "0.7" between the faces 302b and 302d.

If at step 406 there are more faces to compare, then the method 400 returns to step 404 and compares another pair of faces. Otherwise, the method 400 constructs a weighted undirected graph at step 408, where the faces are nodes and the similarity scores are edges that link the nodes. For example, the graph generator 202 constructs the nodes 312b and 312d representing the faces 302b and 302d. The graph generator 202 links the nodes 312b and 312d with an edge associated with the similarity score of "0.7" between the nodes 312b and 312d.

At step 410, the method 400 receives a user input labeling a subset of the face nodes as either male or female. For example, the gender determination system 102 may receive a user input including the predetermined gender label values 206. The predetermined gender label values 206 indicate that the node 312b has gender label values of "1.0" Male and "0.0" Female. The inferred gender label generator 112 uses the weighted undirected graph 310 and the predetermined gender label values 206 to infer the gender of one or more faces represented by nodes in the weighted undirected graph 310.

Figure 5:
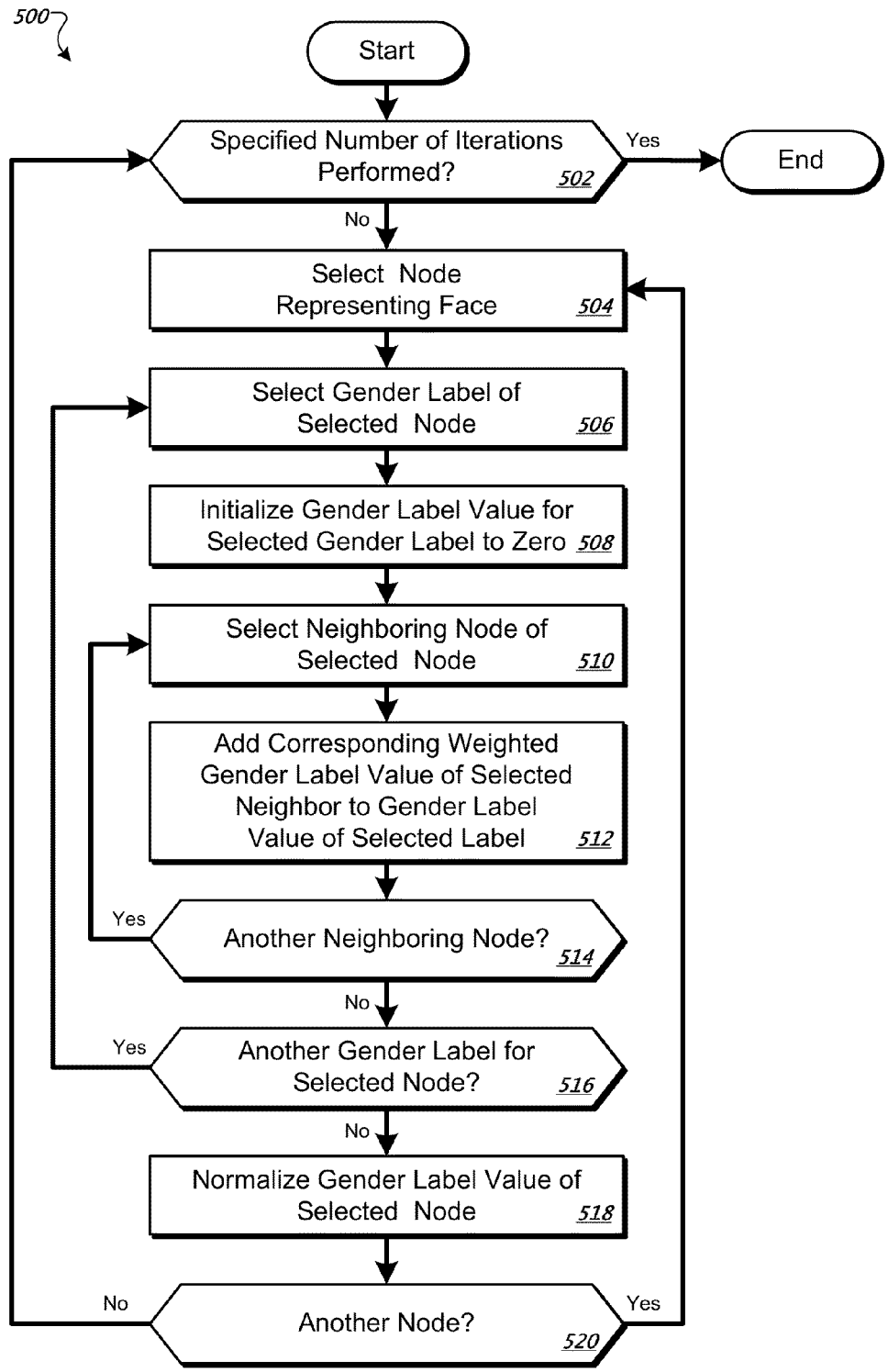
FIG. 5 is a flow chart showing an example of a method for inferring the gender of a face in an image using a weighted undirected graph of similarities between faces in images.

FIG. 5 is a flow chart showing an example of a method 500, referred to here as an "adsorption" algorithm, for inferring the gender of a face in an image using a weighted undirected graph of similarities between faces in images. In some implementations, the inferred gender label generator 112 can include instructions that are executed by a processor of the gender determination system 102.

The adsorption algorithm 500 can be executed using information from the graphs shown in FIGS. 3C-D and can be executed for every node in the graphs. The adsorption algorithm 500 can start with step 502, which determines if a specified number of iterations have run for a graph. If the number is not complete, step 504 is performed. In step 504, a node representing a face is selected. For example, the inferred gender label generator 112 can select a node that has gender label values that may be modified by the algorithm, such as "Male" or "Female."

In step 506, a gender label is selected from the selected node. For example, the inferred gender label generator 112 can select the gender label "Male" if present in the selected node. In step 508, a gender label value for the selected gender label is initialized to zero. For example, the inferred gender label generator 112 can set the gender label value for "Male" to zero.

In step 510, a neighboring node of the selected node can be selected. For example, the selected node may specify that a neighboring node has a similarity score of "0.7" with the selected node. The inferred gender label generator 112 can select the neighboring node.

In step 512, a corresponding weighted gender label value of a selected neighbor is added to a gender label value of the selected gender label. For example, if the selected neighboring node has a gender label value for the gender label "Male," the inferred gender label generator 112 can add this value to the selected node's gender label value for "Male." In certain implementations, the gender label value retrieved from a neighboring node can be weighted to affect the contribution of the gender label value based on the degree of distance from the selected node (e.g., based on whether the neighboring node is linked directly to the selected node, linked by two edges to the selected node, etc.) In some implementations, the gender label value can also be based on a weight or similarity score associated with the edge.

In step 514, it is determined whether there is another neighbor node to select. For example, the inferred gender label generator 112 can determine if the selected node is linked by a single edge to any additional neighbors that have not been selected. In another example, a user may specify how many degrees out (e.g., linked by two edges, three edges, etc.) the inferred gender label generator 112 should search for neighbors. If there is another neighbor that has not been selected, steps 510 and 512 can be repeated, as indicated by step 514. If there is not another neighbor, step 516 can be performed.

In step 516, it is determined whether there is another gender label in the selected node. For example, the selected node can have multiple gender labels, such as "Male" and "Female." If these additional gender labels have not been selected, the inferred gender label generator 112 can select one of the previously unselected gender labels and repeat steps 506-514. If all the gender labels in the node have been selected, the gender label values of the selected node can be normalized, as shown in step 518. For example, the inferred gender label generator 112 can normalize each gender label value so that it has a value between 0 and 1, where the gender label value's magnitude is proportional to its contribution relative to all the gender label values associated with that node.

In step 520, it can be determined whether there are additional nodes in the graph to select. If there are additional nodes, the method can return to step 504. If all the nodes in the graph have been selected, the method can return to step 502 to determine whether the specified number of iterations has been performed on the graph. If so, the adsorption algorithm 500 can end.

In certain implementations, the adsorption algorithm 500 can include the following pseudo code:
Set t=0
For each node, n, in the similarity graph, G:
    For each gender label, I:
        Initialize the gender label: $n_{i,t}$=0.0;
For t=1 . . . x iterations:
    For each node used to label other nodes, n, in the similarity graph, G:
        For each gender label, I:
            Initialize the gender label value: $n_{i,t+1}$=$n_{i,t}$ For each node to be labeled, n, in the similarity graph, G:
    For each gender label, I:
        Initialize the gender label value: $n_{i,t+1}$=$n_{t,injection}$;
//where $n_{t,injection}$ is a node having a static assigned value
For each node, n, in the similarity graph, G:
    For each node, m, that has an edge with similarity $s_{mn}$, to n:
        For each gender label:

$n_{i,t+1}$=$n_{i,t+1}$+($s_{mn}$*$m_{i,t}$)

Normalize the weight of the gender labels at each n, so that the sum of
    the labels at each node=1.0

In certain implementations, after "x" iterations, the inferred gender label generator 112 can examine one or more of the nodes of the graph and probabilistically assign a gender label to each node based on the weights of the gender labels (e.g., a label with the maximum label value can be assigned to the node).

In some implementations, the number of the iterations is specified in advance. In other implementations, the algorithm terminates when the gender label values for the gender labels at each node reach a steady state (e.g., a state where the difference in the label value change between iterations is smaller than a specified epsilon).

In another alternative method, gender label values for nodes can be inferred by executing a random walk algorithm on the graphs. More specifically, in some implementations, given a graph, G, the inferred gender label generator 112 can calculate gender label values, or label weights, for every node by starting a random walk from each node. The random walk algorithm can include reversing the direction of each edge in the graph if the edge is directed. If the edge is bi-directional or undirected, the edge can be left unchanged.

The inferred gender label generator 112 can select a node of interest and start a random walk from that node to linked nodes. At each node where there are multiple-out nodes (e.g., nodes with links to multiple other nodes), the inferred gender label generator 112 can randomly select an edge to follow. If the edges are weighted, the inferred gender label generator 112 can select an edge based on the edge's weight (e.g., the greatest weighted edge can be selected first).

If during the random walk, a node is selected that is a labeling node (e.g., used as a label for other nodes), the classification for this walk is the label associated with the labeling node. The inferred gender label generator 112 can maintain a tally of the labels associated with each classification.

If during the random walk, a node is selected that is not a labeling node, the inferred gender label generator 112 selects the next random path, or edge, to follow.

The inferred gender label generator 112 can repeat the random walk multiple times (e.g., 1000s to 100,000s of times) for each node of interest. After completion, the inferred gender label generator 112 can derive the gender label values based on the tally of labels. This process can be repeated for each node of interest.

Additionally, in some implementations, the inferred gender label generator 112 generates a second data structure, such as a second graph. The second graph can include nodes substantially similar to the weighted undirected graph 310. In one example, the weighted undirected graph 310 includes Male gender label values and a second graph includes Female gender label values.

In some implementations, the adsorption algorithm 500 can also be performed on the second graph. The inferred gender label generator 112 can select and compare the resulting label value magnitudes for a corresponding node from both the first and second graphs. In some implementations, the inferred gender label generator 112 can combine the gender label value magnitudes from each graph through linear weighting to determine a final gender label value magnitude (e.g., the first graph's gender label value contributes 0.7 and the second graph's gender label value contributes 0.3). In other implementations, the gender label values can be weighed equally to determine the final gender label value (e.g., 0.5, 0.5), or the inferred gender label generator 112 can give one gender label value its full contribution while ignoring the gender label value from the other graph (e.g., [1.0, 0.0] or [0.0, 1.0]).

In other implementations, the inferred gender label generator 112 can use a cross-validation method to set the contribution weights for gender label value magnitudes from each graph. For example, the inferred gender label generator 112 can access nodes in a graph, where the nodes have gender label value magnitudes that are known. The inferred gender label generator 112 can compare the actual gender label value magnitudes with the known gender label value magnitudes. The inferred gender label generator 112 can then weight each graph based on how closely its gender label values match the known gender label values.

In certain implementations, the inferred gender label generator 112 can compare the gender label value magnitudes to an expected a priori distribution, instead of or in addition to examining the final gender label magnitudes. For example, if a summed value of a first gender label across all nodes is 8.0 and the summed value of a second gender label across all of the nodes is 4.0, the a priori distribution suggests that first gender label may be twice as likely to occur as the second gender label. The inferred gender label generator 112 can use this expectation to calibrate the gender label value magnitudes for each node. If in a particular node, the first gender label value is 1.5 and the second gender label value is 1.0, then the evidence for the first gender label, although higher than the second gender label, is not as high as expected because the ratio is not as high as the a priori distribution. This decreases the confidence that the difference in magnitudes is meaningful. A confidence factor can be translated back into the rankings.

In some implementations, if the difference in magnitudes is below a confidence threshold, the inferred gender label generator 112 can rank a gender label with a lower value above a gender label with a higher value (e.g., manipulate the lower value so that it is increased to a gender label value greater than the higher value). For example, if the first gender label's value is expected to be three times the value of the second gender label, but was only 1.1 times greater than the second gender label, the inferred gender label generator 112 can rank the second gender label above the first gender label. In some implementations, the confidence factor can be kept as a confidence measure, which can be used, for example, by machine learning algorithms to weight the resultant label value magnitudes.

In yet other implementations, instead of or in addition to comparing the gender label value magnitudes based on the a priori distribution of the nodes, the inferred gender label generator 112 can compare the gender label value magnitudes based on an end distribution of magnitudes across all nodes. For example, the inferred gender label generator 112 can measure how different a particular node's distribution is from an average calculated across all nodes in a graph.

Figure 6A:
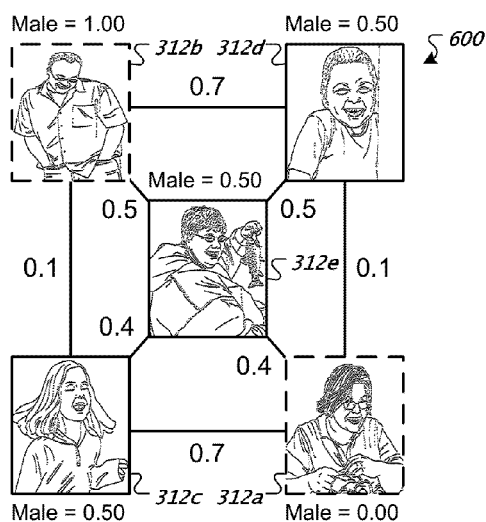
FIGS. 6A-D show examples of gender values in a weighted undirected graph before performing a gender inferring process and after one iteration, two iterations, and four iterations of the gender inferring process, respectively.

FIGS. 6A-D show examples of gender values in a weighted undirected graph 600 before performing a gender inferring process and after one iteration, two iterations, and four iterations of the gender inferring process, respectively. Referring to FIG. 6A, the weighted undirected graph 600 includes predetermined and initial gender values for the nodes 312a-e. The weighted undirected graph 600 only shows Male gender labels for the sake of clarity. Other gender labels may be included in the weighted undirected graph 600 or another graph having nodes corresponding to nodes in the weighted undirected graph 600.

The weighted undirected graph 600 includes predetermined gender label values for the nodes 312a-b of "0.00" Male and "1.00" Male, respectively. The nodes 312c-e have initial gender label values of "0.50" Male. In some implementations, an initial gender label value may be a predetermined value, such as "0.50." Alternatively, the initial gender label value may be based on the average of the predetermined gender label values 206 or another set of gender label values.

Figure 6B:
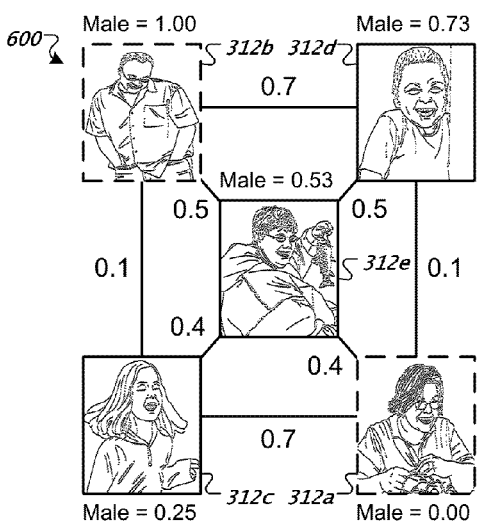

Referring to FIG. 6B, the weighted undirected graph 600 now shows the Male gender label values of the nodes 312a-e after one iteration of the inferred gender label generator 112. In this example, the Male gender label values of the nodes 312a-b are fixed at "0.00" and "1.00," respectively. The Male gender label values of the nodes 312c-e are now "0.25," "0.73," and "0.53," respectively. The relatively high similarity between the nodes 312a and 312c as compared to other nodes gives the node 312c a Male gender label value ("0.25") close to the Male gender label value of the node 312a ("0.00"). Similarly, the relatively high similarity between the nodes 312b and 312d as compared to other nodes gives the node 312d a Male gender label value ("0.73") close to the Male gender label value of the node 312b ("1.00"). The node 312e has slightly higher similarity with the nodes 312b and 312d leading to a Male gender value ("0.53") that leans toward Male.

Figure 6C:
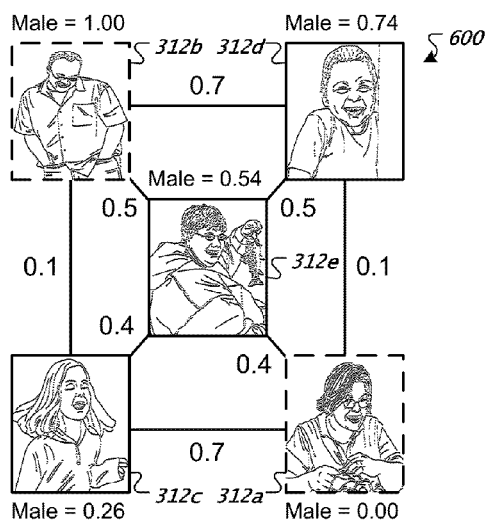

Referring to FIG. 6C, the weighted undirected graph 600 now shows the gender label values for the nodes 312a-e after two iterations of the inferred gender label generator 112. The Male gender label value of the node 312c has increased by "0.01" to "0.26." The Male gender label value of the node 312d has increased by "0.01" to "0.74." The Male gender label value of the node 312e has increased by "0.01" to "0.54." In some implementations, the inferred gender label generator 112 may stop processing a graph after the change in each gender label value is below a particular threshold, such as "0.01."

Figure 6D:
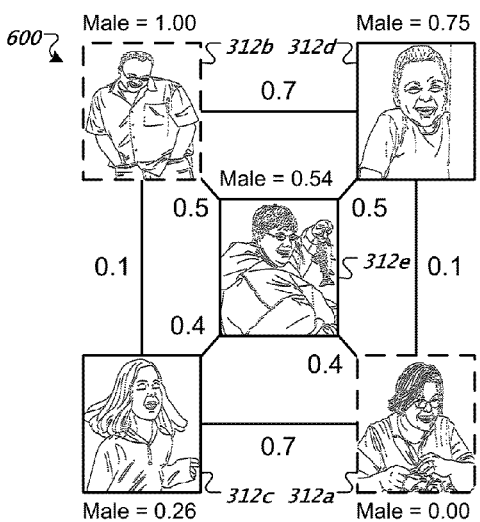

Referring to FIG. 6D, the weighted undirected graph 600 now shows the gender label values for the nodes 312a-e after four iterations of the inferred gender label generator 112. The Male gender label value of the node 312d has increased by "0.01" to "0.75." The Male gender label values of the nodes 312a-e have now converged within "0.01." The inferred gender label generator 112 stops processing the weighted undirected graph 600 and outputs the Male gender label values. Alternatively, the inferred gender label generator 112 may stop processing after a predetermined number of iterations, such as five iterations.

In some implementations, the inferred gender label generator 112 infers Female gender label values for the nodes 312a-e in addition to the Male gender label values previously described. The inferred gender label generator 112 can compare and/or combine the Male and Female gender label values to determine a gender for the faces 302a-e associated with the nodes 312a-e. For example, if the Male gender label value of a node is larger than its Female gender label value than the corresponding face is determined to be Male and vice versa for Female.

FIG. 7A shows an example of a table 700 that stores gender values for the faces 302a-e. The weighted undirected graphs 310 and 600 may stored in the data storage 110 or structured in a memory module as tables, such as the table 700. In particular, the table 700 includes an identifier 702 for each of the faces 302a-e, an indication 704 of where similarity scores to other faces can be found, a Male gender label value 706, and a Female gender label value 708. The entry in the table 700 for Face A indicates that the similarity scores associated with face can be found in Table A.

FIG. 7B shows an example of a table 710 that stores similarity scores between a first face and other faces. In particular, the table 710 represents Table A, which includes the similarity scores associated with Face A from the table 700. The table 710 includes an identifier 712 for each of the associated faces and a corresponding similarity score 714.

Figure 8:
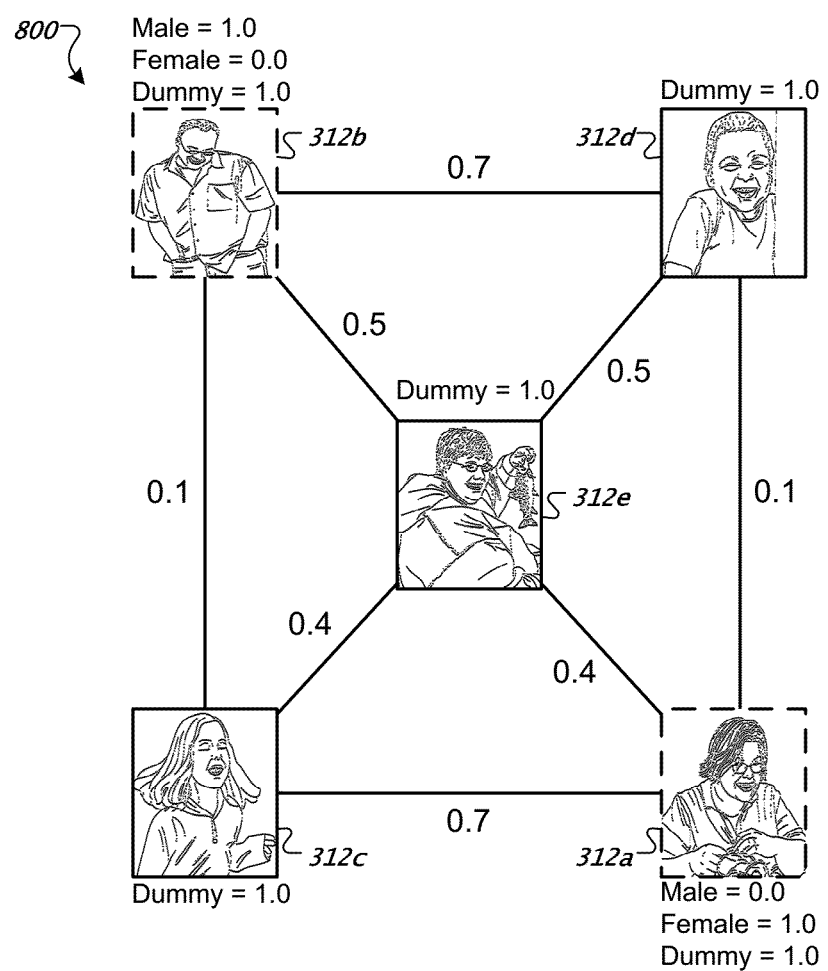
FIG. 8 shows an example of a weighted undirected graph including dummy labels.

FIG. 8 shows an example of a weighted undirected graph 800 including dummy labels. In certain implementations, dummy labels can be used in the weighted undirected graph 800 to reduce effects of distant neighboring nodes. When the label value of a node is determined based on, for example, the label with the greatest label value, the weight assigned to the dummy label can be ignored and the remaining weights used in the determination. For example, the dummy labels' contribution can be removed from the calculation of the label values at the end of the algorithm (e.g., after the label values have reached a steady state or a specified number of iterations have occurred).

In certain implementations, dummy labels can be used in all of the graphs generated by the inferred label generator. In other implementations, a user may specify for which graph(s) the dummy labels may be used.

The example of dummy labels shown here associates a dummy node with each of the nodes 312a-e in the weighted undirected graph 800. In other implementations, dummy labels are assigned to a small number of nodes, such as nodes that are not associated with initial gender label values.

Figure 9:
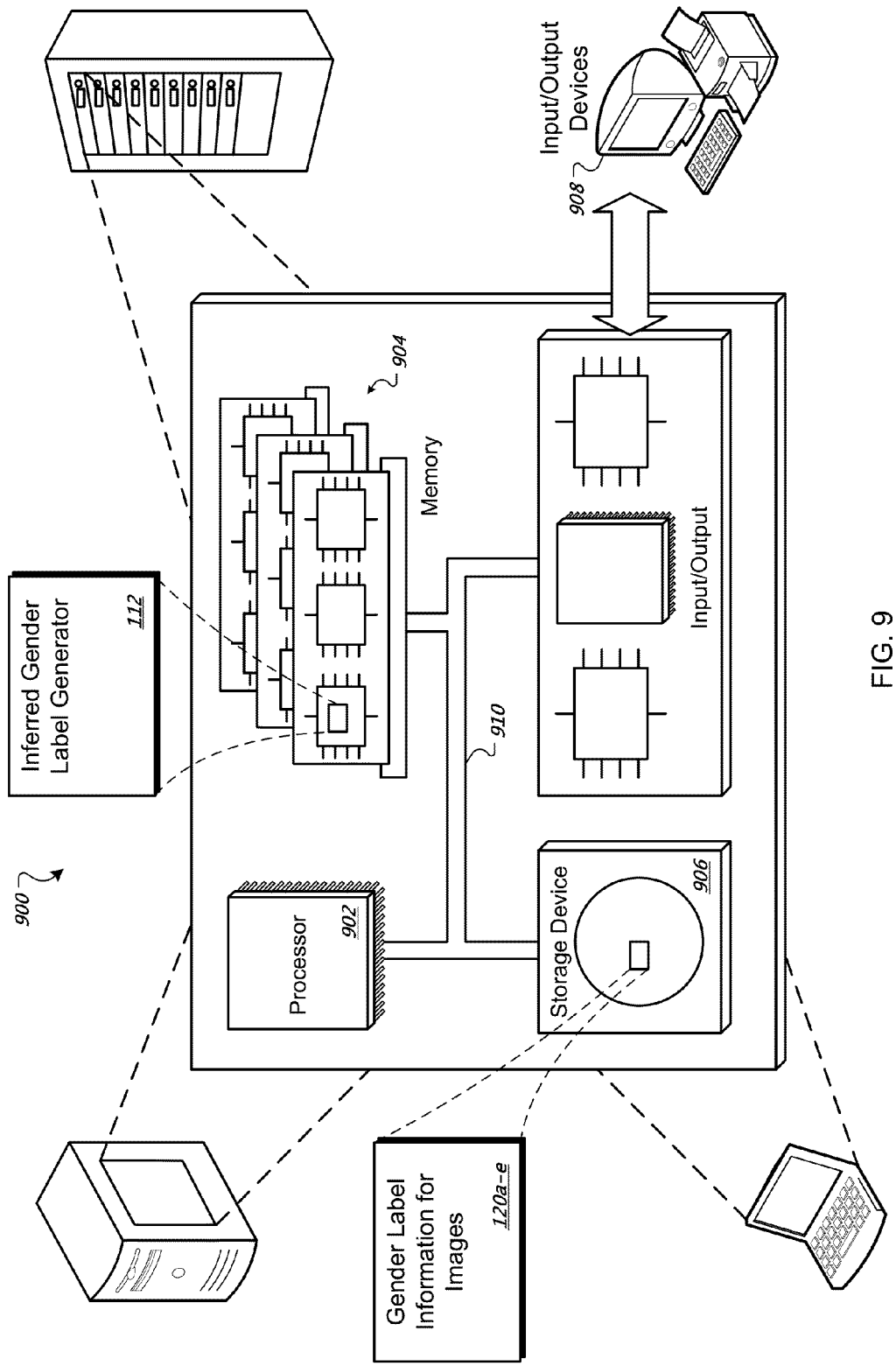
FIG. 9 is a schematic diagram showing an example of a generic computing system that can be used in connection with computer-implemented methods described in this document.

FIG. 9 is a schematic diagram of a generic computing system 900. The generic computing system 900 can be used for the operations described in association with any of the computer-implement methods described previously, according to one implementation. The generic computing system 900 includes a processor 902, a memory 904, a storage device 906, and an input/output device 908. Each of the processor 902, the memory 904, the storage device 906, and the input/output device 908 are interconnected using a system bus 910. The processor 902 is capable of processing instructions for execution within the generic computing system 900. In one implementation, the processor 902 is a single-threaded processor. In another implementation, the processor 902 is a multi-threaded processor. The processor 902 is capable of processing instructions stored in the memory 904 or on the storage device 906 to display graphical information for a user interface on the input/output device 908.

The memory 904 stores information within the generic computing system 900. In one implementation, the memory 904 is a computer-readable medium. In one implementation, the memory 904 is a volatile memory unit. In another implementation, the memory 904 is a non-volatile memory unit.

The storage device 906 is capable of providing mass storage for the generic computing system 900. In one implementation, the storage device 906 is a computer-readable medium. In various different implementations, the storage device 906 may be a floppy disk device, a hard disk device, an optical disk device, or a tape device.

The input/output device 908 provides input/output operations for the generic computing system 900. In one implementation, the input/output device 908 includes a keyboard and/or pointing device. In another implementation, the input/output device 908 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other Although a few implementations have been described in detail above, other modifications are possible. For example, image or facial labels other than gender may be used, such as ethnicity or complexion.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by a computing system, images that display a particular visible physical feature for multiple people displayed in the images;
determining, by the computing system, similarities in appearance among the particular visible physical features for at least some of the people displayed in the images;
for each person in at least a subset of the people displayed in the images:
identifying one or more people displayed in the images whose particular visible physical feature is determined to be similar to the particular visible physical feature of the person,
identifying a respective classification for the particular visible physical feature of each of the one or more people, and
determining a classification for the particular visible physical feature of the person based on the respective classifications for the particular visible physical features of the one or more people whose particular visible physical feature is determined to be similar to the particular visible physical feature of the person; and
outputting, by the computing system, information that characterizes the classification of the particular visible physical feature determined for at least one of the people displayed in the images.

2. The method of claim 1, further comprising generating a data structure that includes representations of the particular visible physical features of at least a second subset of the people displayed in the images and that specifies links among at least some of the representations of the particular visible physical features.

3. The method of claim 2, wherein the data structure comprises a plurality of nodes and edges, each node in the data structure corresponding to a particular representation of the particular visible physical feature of a person displayed in the images, and each edge in the data structure linking a pair of nodes among the plurality of nodes and indicating a respective similarity score for the representations of the particular visible physical feature corresponding to the pair of nodes.

4. The method of claim 1, wherein the particular visible physical feature comprises a face.

5. The method of claim 1, wherein, for each person in the at least subset of people displayed in the images, determining the classification for the particular visible physical feature of the person comprises determining a likelihood that the person is male or female based on the respective classifications for the particular physical features of the one or more people indicating likelihoods that each of the one or more people are male or female, respectively.

6. The method of claim 1, further comprising identifying the one or more people whose particular visible physical feature is determined to be similar to the particular visible physical feature of the person by performing a random walk algorithm on a data structure that links representations of the particular visible physical feature of at least some of the people displayed in the images.

7. The method of claim 6, further comprising performing multiple iterations of the random walk algorithm on the data structure by performing the random walk algorithm a predetermined number of times or until respective classification values for at least some representations of the particular visible physical feature from among the multiple representations of the particular visible physical feature linked in the data structure converge such that the respective classification values change less than a threshold amount over corresponding classification values determined from a previous iteration of the random walk algorithm.

8. The method of claim 1, wherein the classification for the particular visible physical feature of at least one of the one or more people is seeded from user input.

9. The method of claim 1, wherein the classification for the particular visible physical feature of at least one person from among the at least subset of the people displayed in the images is determined further based on respective classifications for the particular visible physical feature of one or more additional people whose particular visible physical feature is determined to be similar to the particular visible physical feature of at least one of the one or more people.

10. The method of claim 1, wherein determining the classification for the particular visible physical feature of the person comprises performing an adsorption algorithm.

11. A computer program product tangibly embodied in one or more non-transitory computer-readable storage devices that, when executed by one or more processors, causes performance of operations comprising:
receiving, by a computing system, images that display a particular visible physical feature for multiple people displayed in the images;
determining, by the computing system, similarities in appearance among the particular visible physical features for at least some of the people displayed in the images;
for each person in at least a subset of the people displayed in the images:
identifying one or more people displayed in the images whose particular visible physical feature is determined to be similar to the particular visible physical feature of the person,
identifying a respective classification for the particular visible physical feature of each of the one or more people, and
determining a classification for the particular visible physical feature of the person based on the respective classifications for the particular visible physical features of the one or more people whose particular visible physical feature is determined to be similar to the particular visible physical feature of the person; and
outputting, by the computing system, information that characterizes the classification of the particular visible physical feature determined for at least one of the people displayed in the images.

12. The computer program product of claim 11, wherein the operations further comprise generating a data structure that includes representations of the particular visible physical features of at least a second subset of the people displayed in the images and that specifies links among at least some of the representations of the particular visible physical features.

13. The computer program product of claim 12, wherein the data structure comprises a plurality of nodes and edges, each node in the data structure corresponding to a particular representation of the particular visible physical feature of a person displayed in the images, and each edge in the data structure linking a pair of nodes among the plurality of nodes and indicating a respective similarity score for the representations of the particular visible physical feature for the pair of nodes.

14. The computer program product of claim 11, wherein the particular visible physical feature comprises a face.

15. The computer program product of claim 11, wherein, for each person in the at least subset of people displayed in the images, determining the classification for the particular visible physical feature of the person comprises determining a likelihood that the person is male or female based on the respective classifications for the particular physical features of the one or more people indicating likelihoods that each of the one or more people are male or female, respectively.

16. The computer program product of claim 11, wherein the operations further comprise identifying the one or more people whose particular visible physical feature is determined to be similar to the particular visible physical feature of the person by performing a random walk algorithm on a data structure that links multiple representations of the particular visible physical feature of at least some of the people displayed in the images.

17. The computer program product of claim 16, wherein the operations further comprise performing multiple iterations of the random walk algorithm on the data structure by performing the random walk algorithm a predetermined number of times or until respective classification values for at least some representations of the particular visible physical feature from among the multiple representations of the particular visible physical feature linked in the data structure converge such that the respective classification values change less than a threshold amount over corresponding classification values determined from a previous iteration of the random walk algorithm.

18. The computer program product of claim 11, wherein the classification for the particular visible physical feature of at least one of the one or more people is seeded from user input.

19. The computer program product of claim 11, wherein the classification for the particular visible physical feature of at least one person from among the at least subset of the people displayed in the images is determined further based on respective classifications for the particular visible physical feature of one or more additional people whose particular visible physical feature is determined to be similar to the particular visible physical feature of at least one of the one or more people.

20. A system comprising:
one or more computers configured to provide:
an image repository to store a plurality of images;
a visible physical feature detector to identify respective visible physical features among people displayed in the plurality of images;
a similarity calculator to determine similarities in appearance among representations of the visible physical features of the people displayed in the images;
a graph generator to link the representations of the visible physical features based on the determined similarities in appearance among the representations of the visible physical features; and
a classification generator to determine classification values for particular ones of the representations of the visible physical features based on the determined similarities in appearance among the particular representations of the visible physical features and other ones of the representations of the visible physical features that are linked to the particular representations, wherein the classification values indicate a likelihood that respective ones of the people displayed in the plurality of images corresponding to the representations of the visible physical features have a particular visually discernible characteristic.

* * * * *